United States Patent [19]

Schaarschmidt

[11] Patent Number: 5,125,824
[45] Date of Patent: Jun. 30, 1992

[54] DEGASSING EXTRUDER

[75] Inventor: Holger Schaarschmidt, Hanover, Fed. Rep. of Germany

[73] Assignee: Hermann Berstorff Maschinenbau GmbH, Fed. Rep. of Germany

[21] Appl. No.: 725,681

[22] Filed: Jul. 3, 1991

[30] Foreign Application Priority Data

Jul. 7, 1990 [DE] Fed. Rep. of Germany ....... 4021751

[51] Int. Cl.⁵ .............................................. B29C 47/76
[52] U.S. Cl. ..................................... 425/203; 159/2.2; 159/2.3; 264/101; 425/204; 425/208; 425/192 R; 366/75
[58] Field of Search ................ 264/102, 101, DIG. 78; 425/203, 204, 208, 376.1, 186, 188, 192 R; 366/75; 159/2.2, 2.3

[56] References Cited

U.S. PATENT DOCUMENTS

| | | | |
|---|---|---|---|
| 3,391,232 | 7/1968 | Jackson | 264/102 |
| 3,501,807 | 3/1970 | Selbach | 425/203 |
| 3,963,558 | 6/1976 | Skidmore | 425/203 |
| 4,029,300 | 6/1977 | Morishima et al. | 425/203 |
| 4,136,968 | 1/1979 | Todd | 425/204 |

FOREIGN PATENT DOCUMENTS

| | | | |
|---|---|---|---|
| 2321325 | 11/1974 | Fed. Rep. of Germany | 425/204 |
| 2625609 | 6/1976 | Fed. Rep. of Germany | |
| 158014 | 12/1982 | Fed. Rep. of Germany | 425/208 |
| 2052281 | 1/1981 | United Kingdom | 425/208 |

*Primary Examiner*—Jeffery Thurlow
*Attorney, Agent, or Firm*—Foley & Lardner

[57] ABSTRACT

A method of degassing a molten mass of thermoplastic, plastics material containing residual monomers and a twin-screw extruder capable of effecting such degassing. A molten mass of plastics material and a stripping agent are intermixed at a pressure which prevents the stripping agent from changing from liquid to gas at the temperature of the molten mass. The pressure necessary is achieved by the use of a pressure restrictor, which is yoke-shaped and is connected to the extruder housing in a force-fitting manner using centering means but which effectively blocks the processing chamber of the extruder downstream thereof to the molten material with the exception of a maximum of two throughbores for such material.

10 Claims, 3 Drawing Sheets

DEGASSING EXTRUDER

FIELD OF THE INVENTION

The present invention relates to a method of degassing a molten mass of thermoplastic plastics material and to an extrusion device suitable for carrying out such a method. More particularly, the present invention relates to a method of degassing a thermoplastic plastics material which contains monomeric material and to a twin-screw extruder capable of carrying out such a method.

BACKGROUND OF THE INVENTION AND PRIOR ART DISCUSSION

In the production of thermoplastic plastics materials, it is often necessary to remove residual monomers from the starting plastics material. For example, if a packaging film for foodstuffs is to be produced by extrusion, the residual monomers may be harmful to health. For medical reasons, therefore, the residual monomer content is not permitted to exceed a predetermined limit value which is laid down in regulations governing foodstuffs. If the film is to be made from extruded polystyrene, the polystyrene often contains up to 100,000 parts per million of monomeric styrene and a highly effective degassing arrangement is necessary in the extruder in order for the amount of the residual monomers present in the final product to be reduced to below the limit amount which is of the order of 1000 parts per million.

In the degassing of such plastics materials in a single-screw extruder, it has long been known to provide an injection location for a stripping agent, with which the molten mass of plastics material is mixed in the extruder. In a degassing section disposed downstream of the injection location, this stripping agent, which is generally water, ensures that the molten mass foams if the extrusion pressure reduces. The increase in the free surface area of the molten mass, caused by such foaming effectively degasses the molten mass which is then suitable for a wide range of applications.

The proportion of residual monomers present in the product produced in a single-screw extruder is, however, still not sufficiently low for the product to be utilisable in many fields of application, particularly those where the plastics material product is intended to come into direct contact with, for example, foodstuffs.

In German Offenlegungsschrift No. 26 25 609, there is disclosed a twin-screw extruder for the degassing of molten masses containing residual monomers. Particular problems arise, however, with a twin-screw extruder because of its structural features. In particular, the nip region of the extruder, that is to say, the region in which the cross-section of the processing chamber of the extruder is constricted, prevents the desired pressure in the molten mass, which is necessary for optimum mixing of the molten mass with the stripping agent, from being achieved.

To solve this problem, this prior document proposes the provision of adjusting and locking rings upstream and downstream respectively of the injection location for the stripping agent. These rings are mounted on the extruder screws and rotate therewith. In such a case, the diameter of the upstream adjusting ring should substantially be equal to the external diameter of the extruder screw with which it is associated. However, the diameter of the locking ring, which is disposed downstream of the injection location, should be somewhat greater than that of the adjusting ring.

The nip region can be unilaterally constricted by means of a substantially V-shaped operating barrel which protrudes into the processing chamber and which is adapted to the circular shape of the adjusting rings. In consequence, the quantity of material conveyed between the internal wall of the barrel and the adjusting rings can be regulated to a certain extent, as can the pressure in the extruder. A stream of molten material, which passes in such a manner into the injection region between the adjusting and locking rings, is brought into contact with the injected water by means of kneading means on the extruder screws. The water evaporates upon contact with the molten mass and this causes foaming in the adjacent degassing section of the extruder.

The degassing efficiency of such an extruder is undoubtedly better than that of a twin-screw extruder without any means for controlling the stream of molten mass passing into the kneading section. However, even such an arrangement suffers from the disadvantage that the injected water evaporates immediately upon contact with the molten material and, in consequence, only a very poor mixing of water and the molten material occurs.

OBJECTS OF THE PRESENT INVENTION

Accordingly the present invention seeks to provide a degassing method and a twin-screw extruder suitable for effecting such degassing wherein the degassing efficiency is further increased by producing improved mixing of the molten material and the injected stripping agent.

SUMMARY OF THE INVENTION

According to the present invention, there is provided a method of degassing a mass of thermoplastic plastics material containing residual monomers in a twin-screw extruder, comprising the steps of:

a) introducing the plastics material into the extruder;

b) plasticising said plastics material and conveying said material through said extruder to provide said material with a first temperature and pressure and injecting a liquid stripping agent into said plastics material whereby said first temperature and pressure are such as to cause said stripping agent to remain in liquid form;

c) mixing said liquid entraining agent with said molten mass of said plastics material in said extruder;

d) relieving the pressure on said mixture of plastics material and stripping agent whilst continuing conveyance of said mixture, thereby causing said mixture to foam and to cause said stripping agent and said residual monomers to become gaseous;

e) removing said gaseous residual monomers and stripping agent from said molten mass of plastics material;

g) continuing said conveyance of said degassed molten plastics material through said extruder and increasing the pressure thereof; and h) discharging said molten plastics material from said extruder at said increased pressure.

Also according to the present invention, there is provided a twin-screw extruder suitable for degassing a thermoplastic plastics material containing residual monomers comprising an extruder housing; said extruder housing having a longitudinal axis and an internal wall surface disposed around said longitudinal axis; said internal wall surface defining two intersecting, longitudinally extending, axis-parallel bores, said bores jointly forming a treatment chamber; two extruder screws mounted for rotation one in each of said axis-parallel bores; each said screw having opposed first and second end regions, said drive means associated with said first end region of each said screw and means mounting said drive means on said housing; said housing further including an inlet opening communicating with said treatment chamber for said thermoplastic plastics material to be processed; at least one injection opening downstream of said inlet opening and communicating with said treatment chamber for the injection of a stripping agent and at least one degassing aperture communicating with said treatment chamber and located downstream of said injection opening; and pressure augmentation means disposed within said treatment chamber upstream of said degassing aperture for increasing the pressure of said molten mass in said extruder, wherein said pressure augmentation means is a restrictor, said restrictor comprising a yoke body portion, said yoke body portion defining two discrete bores for the passage of said screws therethrough and centring means force-fitting said yoke body portion to said extruder housing; said restrictor at least partially defining a maximum of two throughbores for the passage of said extruded material.

The basic premise upon which the present invention is made is that optimum degassing of the molten mass is only possible when the stripping agent has been completely and homogeneously mixed with the molten material. It is only by achieving this that the molten material can be sufficiently degassed in the degassing section of the extruder so that the limit values set in the regulations governing foodstuffs can be observed.

In order to be able to achieve this complete mixing of the stripping agent, usually water, with the molten mass, it is necessary to increase the pressure of the molten mass to a value which lies above the evaporation pressure of the stripping agent at the temperature of the molten mass. If this is achieved, the stripping agent and the molten mass can easily be mixed together in the liquid phase. The mixed materials are subsequently allowed to expand beneath the degassing opening of the extruder which causes the formation of a large amount of foam. The molten mass can thus be almost fully degassed.

According to the invention, the necessary pressure increase in the molten mass can be achieved by the provision of a pressure restrictor. This latter is in the form of a yoke and is shaped like a pair of spectacles or a fishplate and is interchangeably mounted within the extruder at a preselected location, closely downstream of the injection location for the stripping agent.

The pressure restrictor is connected to the extruder housing in a force-fitting manner by means of centering means. Effectively, the restrictor blocks the passage of the material through the processing chamber of the extruder in a downstream direction with the exception of a maximum of two throughbores. More especially in the nip region, which is important for pressure build-up, in the processing chamber of the extruder, the pressure restrictor prevents a pressure loss as a result of undesired, premature flow of the molten mass into the expansion section of the extruder.

BRIEF DESCRIPTION OF THE DRAWINGS

Two embodiments of the extruder in accordance with the present invention will be further described, by way of example, with reference to the accompanying drawings, in which.

DESCRIPTION OF PREFERRED EMBODIMENTS

Figure 1:
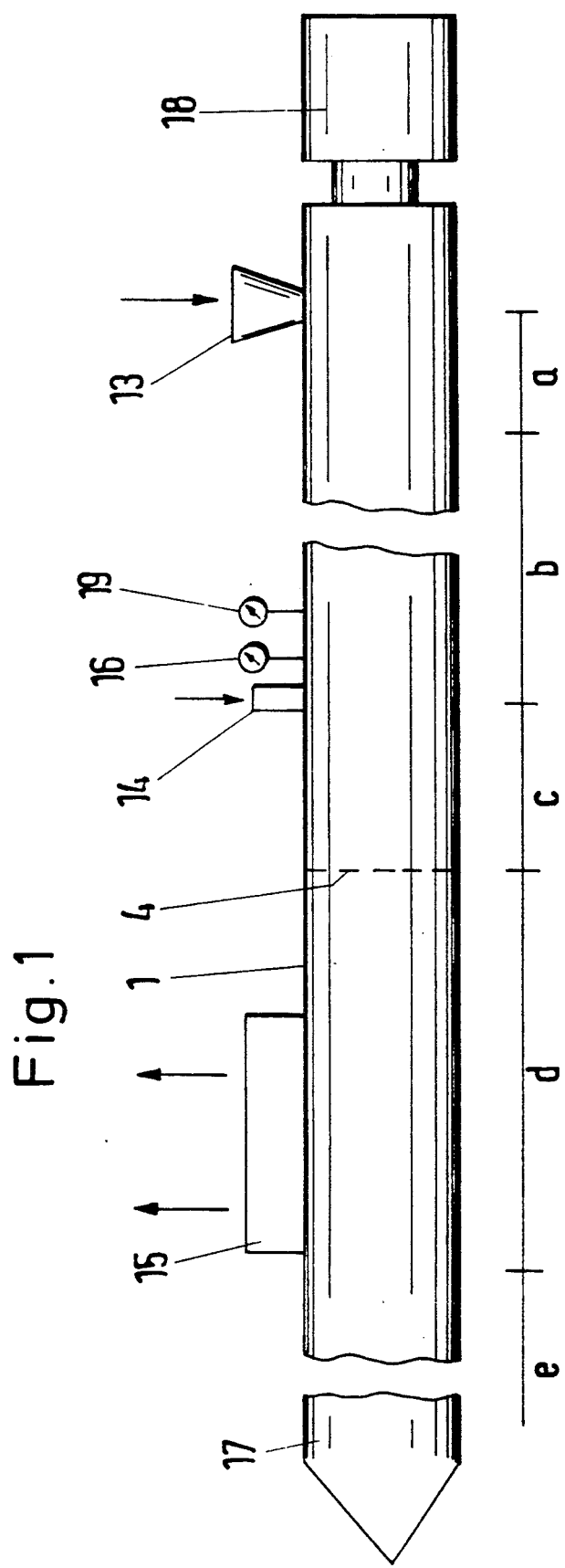
FIG. 1 is a schematic view of a degassing twin-extruder in accordance with the present invention.
Figure 2:
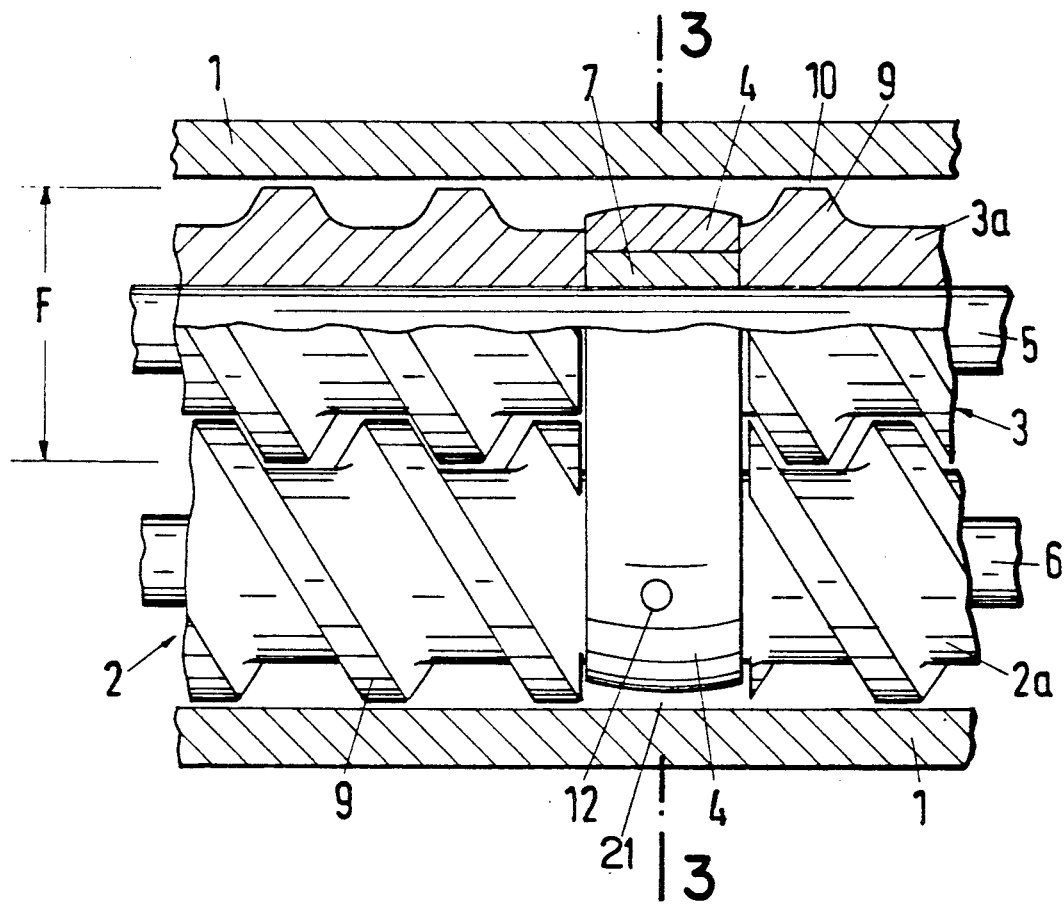
FIG. 2 is a longitudinal cut-away view, partially in section of a first embodiment of an extruder in accordance with the present invention.

In FIG. 1, there is schematically shown a twin-screw degassing extruder comprising a housing 1 upon which is mounted a drive unit 18. The extruder housing 1 can be fed with a monomer-containing molten mass or a monomer-containing granulate of a plastics material through an inlet-port 13. Extruder screws 2, 3, shown in FIG. 2 are rotated in the extruder housing 1 about their own longitudinal axes by the drive unit 18. The screws 2, 3 convey the plastics material from a feed section a into a processing section b, in which the plastics material is plasticised and brought to the required pressure.

A stripping agent, in this case, water, is supplied to the molten mass of plastics material through an injection opening 14 formed in the extruder housing 1. This water is mixed with the molten mass of plastics material in the extruder section c at a pressure which prevents the evaporating of the water. If desired, the pressure of the mixture can be further increased in this section.

In an advantageous embodiment of the invention, and as shown in FIG. 1 the pressure and the temperature of the molten mass in the region of the injection opening 14 is constantly monitored by means of temperature and pressure sensors 16, 19 and such measurements are used as the standard parameters for the operation of the extruder.

A pressure restrictor 4, which is only shown in broken lines in FIG. 1 forms the downstream end of the processing section c.

The mixture of plastics material and water expands downstream of the pressure restrictor 4 with the formation of a substantial amount of foam in the degassing section d. A very large surface area of the plastics material is thus formed from which the monomers and the water can escape. In order to assist the degassing operation, a vacuum pump (not shown) is connected, in a manner which is known per se, to a degassing aperture 15 formed in the extruder housing 1. The monomers and the water are removed through the aperture 15.

Once the molten mass has been largely freed of water and the monomers, it can again be repressurised in the extruder section e, and is then discharged from the extruder by means of an extrusion tool 17.

Figure 3:
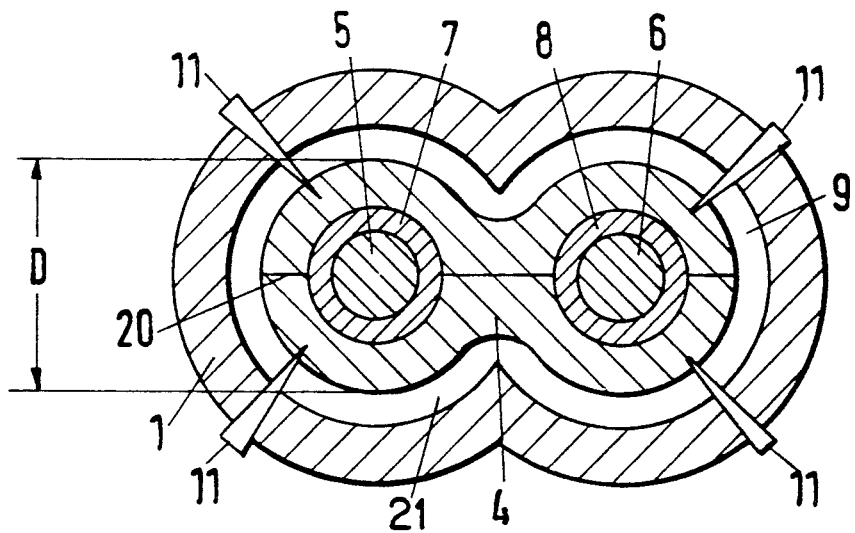
FIG. 3 is a sectional view taken along the line A—A of FIG. 2.

FIG. 2 shows a first embodiment of an extruder in accordance with the present invention with the extruder housing 1 having been cut open in the region in which the pressure restrictor 4 is disposed. In this region, the pressure restrictor 4 interconnects the screws 2, 3 in a form-locking manner, so that no molten material can escape through the nip region of the processing chamber 10. The screw cores 5 and 6 pass through bores in the pressure restrictor 4. A throughbore 21 is provided between the pressure restrictor 4 and the internal wall of the extruder housing, which opening is shaped like a fishplate or a pair of spectacles and through which the mixture of molten mass and water can pass into the degassing section d of the extruder, as shown in FIG. 3.

In this embodiment, the extruder screws 2, 3 comprise screw cores 5, 6 respectively upon which screw sleeves 2a, 3a respectively are located. The sleeves are affixed to their appropriate screw core and each carry screw flights 9. To accommodate the pressure restrictor 4, the screw sleeves 2a, 3a, are interrupted, and interchangeable wear or sealing rings 7, 8 are located around the screw shafts 5, 6 respectively. By so doing, the pressure restrictor 4 can be exactly positioned in the extruder housing, because when the screw assemblies 2, 3, are introduced into the housing 1, centering means 11, which are insertable from the exterior through the extruder housing 1, precisely encounter the bores 12 (FIG. 2) which are formed in the pressure restrictor 4.

In an advantageous embodiment of the invention, the centering means 11 have a conically tapering configuration in order to facilitate such insertion into the bores 12. In addition, the centering means 11 form, in pairs relative to one another, an angle of preferably 40° to 180° relative to the axis of rotation of an extruder screw 2, 3. The region of the extruder housing, which is used for the securement of the pressure restrictor 4, may advantageously be manufactured as a separate pressure restrictor housing component, which is insertable into an already existing extruder housing.

The diameter D of the portions of the restrictor 4 surrounding each shaft and also the depth of the pressure restrictor 4 are to be selected in dependence upon the desired extrusion conditions. As a general rule, the diameter D is so selected that it is smaller than or the same as the overall diameter F of the extruder which it surrounds.

In a variant of the invention (not shown), the wear or sealing rings 7, 8 may also be mounted on reduced diameter portions of the screw sleeves 2a, 3a.

So that the pressure restrictor 4 can be mounted more satisfactorily on the screws 2, 3, the pressure restrictor 4 may be formed into two half-yokes which are joined along a plane 20 which connects the axis of rotation of the two screws 2, 3, and the halves are interconnectable by any suitable connection means.

Figure 4:
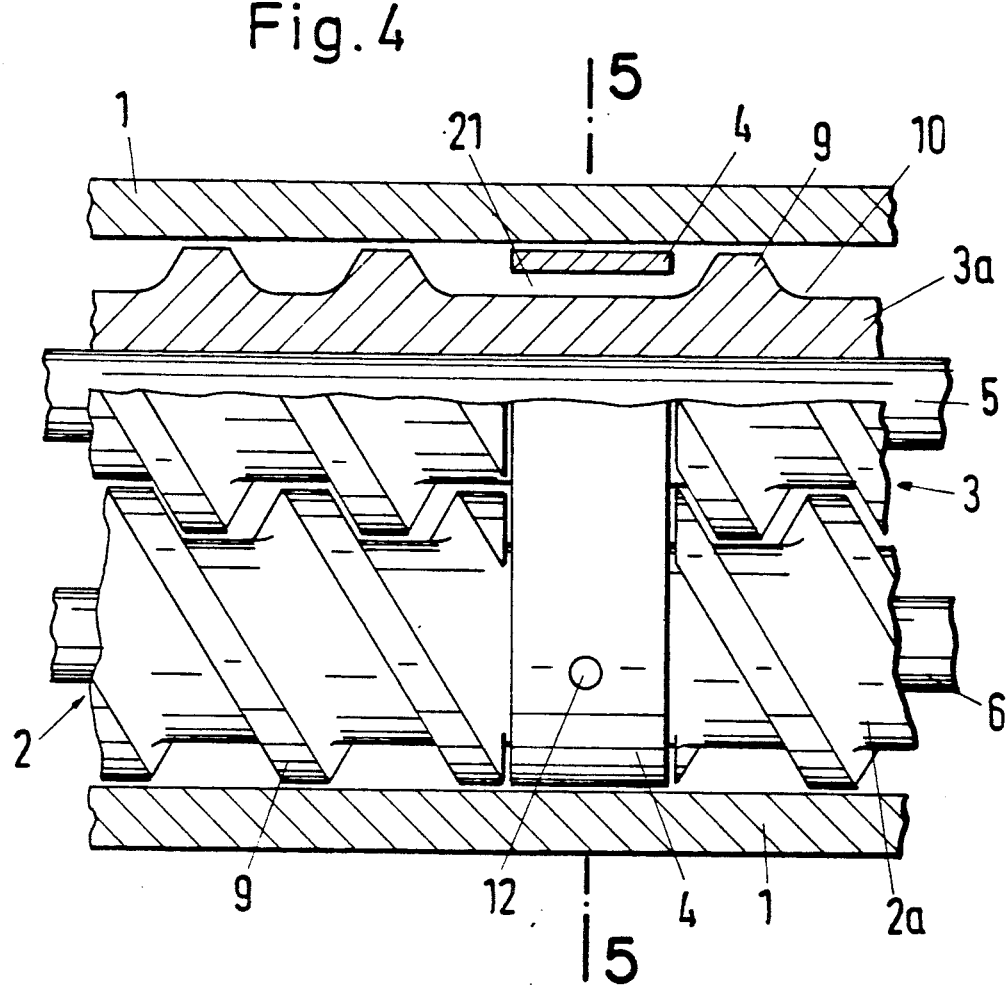
FIG. 4 is a view similar to that shown in FIG. 2 but of a second embodiment of an extruder in accordance with the present invention.
Figure 5:
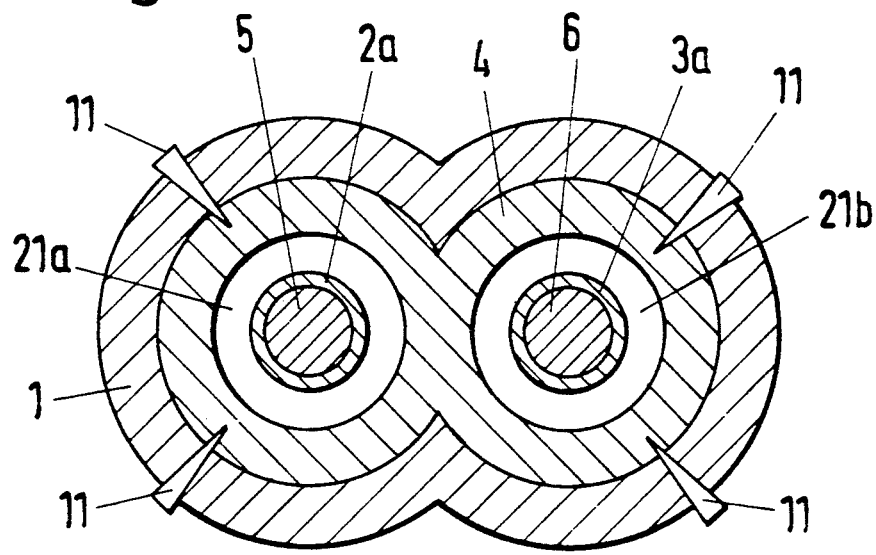
FIG. 5 is a sectional view taken along the line B—B of FIG. 4.

FIGS. 4 and 5 show a further embodiment of an extruder in accordance with the present invention. In this embodiment, the screws 2, 3 of the extruder are again surrounded, in the extruder housing 1, by a pressure restrictor 4, in the form of a closed yoke. The yoke is again shaped like a pair of spectacles or a fishplate and defines a discrete bore for the passage of the screws 2, 3 therethrough. The restrictor 4 is connected to the housing 1 in a force-locking manner by centering 11. However, the pressure restrictor 4 in this embodiment seals the internal wall of the extruder housing in a form-locking manner and also covers here the nip region of the processing chamber 10.

In order to provide the mixture of molten mass and stripping agent with a means for passing through the degassing section, the screw sleeves 2a, 3a have interrupted flights in the region of the restrictor to such an extent that respective throughbores 21a, 21b are formed for the extruder screws 2, 3. The radial width of such an opening is freely selectable, but it may now be so large that the two openings 21a, 21b abut one another by the formation of a nip, as shown in FIG. 5.

In addition, there is also the possibility of interrupting the screw sleeves 2a, 3a in the region of the pressure restrictor 4, and of extending the through-openings 21a, 21b to the surface of the screw cores 5, 6.

I claim:

1. A twin-screw extruder suitable for degassing a molten mass of thermoplastic plastics material containing residual monomers comprising:

an extruder housing having a longitudinal axis and an internal wall surface disposed around said longitudinal axis, said internal wall surface defining two intersecting, longitudinally extending, axis-parallel bores jointly forming a treatment chamber;

two extruder screws each mounted for rotation in each of said axis-parallel bores, each said screw having an axis of rotation and opposed first and second end regions;

drive means associated with said first end region of each said screw, and means mounting said drive means on said housing;

said housing further including an inlet opening communicating with said treatment chamber for feeding said thermoplastic plastics material to be processed, at least one injection opening downstream of said inlet opening and communicating with said treatment chamber for the injection of a stripping agent, and at least one degassing aperture communicating with said treatment chamber and located downstream of said injection opening;

pressure augmentation means in the form of a restrictor disposed within said treatment chamber upstream of said degassing aperture for increasing the pressure of said molten mass in said extruder, said restrictor comprising a yoke body portion formed of first and second half-yokes which abut along a line connecting said axes of rotation of said extruder screws, and means for interconnecting said first and second half-yokes; said yoke body portion defining two discrete bores for the passage of said screws therethrough;

centering means force-fitting said yoke body portion to said extruder housing, and wherein said restrictor at least partially defines a maximum of two throughbores for the passage of said extruded material.

2. A twin-screw extruder as recited in claim 1, wherein said restrictor and said internal wall of said extruder housing are spaced and jointly define a single throughbore for said extruded material, and wherein said extruder further comprises ring members mounted on each said screw means, said ring members form-fitting each said screw means to said restrictor.

3. A twin-screw extruder as recited in claim 2, wherein said ring members are wear rings.

4. A twin-screw extruder as recited in claim 2, wherein said ring members are sealing rings.

5. A twin-screw extruder as recited in claim 1, wherein said restrictor defines two discrete internal throughbores, each said throughbore surrounding one of said screw means, and wherein said restrictor lies against said internal wall of said extruder housing in a form-fitting manner to seal said chamber from said internal wall.

6. A twin-screw extruder as recited in claim 1, wherein each said screw comprises a screw core and a screw sleeve mounted on said core, and wherein each screw is interrupted to receive said restrictor.

7. A twin-screw extruder as recited in claim 1, wherein each said screw comprises a screw core and a screw sleeve mounted on said core, said screw sleeve including a first portion having a first diameter and a second portion having a second diameter smaller than said first diameter, and wherein said second portion receives said restrictor.

8. A twin-screw extruder as recited in claim 1, wherein said centering means comprises a plurality of pin members, each said pin member having a conically tapering configuration.

9. A twin-screw extruder as recited in claim 8, wherein said centering pins form pairs relative to one another, and wherein said pairs of pins subtend an angle lying in the range of from 40° to 180° relative to the axis of rotation of said extruder screw associated therewith.

10. A twin-screw extruder as recited in claim 1, wherein said yoke body portion has a configuration corresponding to the configuration of said internal wall of said housing to provide first and second portions corresponding in shape to said intersecting bores, and wherein the overal diameter of each of said screws is at least equal to the diameter of said one of said first and said second portions of said yoke body portion with which said screw is associated.

* * * * *